United States Patent
Andersen et al.

(10) Patent No.: US 7,313,128 B2
(45) Date of Patent: Dec. 25, 2007

(54) METHOD AND MOBILE RADIO COMMUNICATION NETWORK FOR THE TRANSMISSION OF PACKET DATA

(75) Inventors: Frank-Uwe Andersen, Berlin (DE); Uve Reimer, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 153 days.

(21) Appl. No.: 10/541,696

(22) PCT Filed: Jan. 9, 2003

(86) PCT No.: PCT/DE03/00071

§ 371 (c)(1),
(2), (4) Date: Jul. 8, 2005

(87) PCT Pub. No.: WO2004/064337

PCT Pub. Date: Jul. 29, 2004

(65) Prior Publication Data

US 2006/0135159 A1    Jun. 22, 2006

(51) Int. Cl.
*H04L 12/28* (2006.01)
*H04J 3/24* (2006.01)

(52) U.S. Cl. .................. 370/351; 370/475; 455/452.1

(58) Field of Classification Search ............. 370/351, 370/394, 328, 338, 475, 352; 455/435.1, 455/456.1, 453, 452.1
See application file for complete search history.

(56) References Cited

U.S. PATENT DOCUMENTS

| | | | | |
|---|---|---|---|---|
| 5,430,729 A | * | 7/1995 | Rahnema | 370/409 |
| 6,229,802 B1 | * | 5/2001 | Hippelainen | 370/349 |
| 6,335,939 B1 | * | 1/2002 | Hanna et al. | 370/501 |
| 6,628,954 B1 | * | 9/2003 | McGowan et al. | 455/461 |
| 7,167,475 B2 | * | 1/2007 | Tourunen et al. | 370/394 |
| 2006/0104262 A1 | * | 5/2006 | Kant et al. | 370/352 |

* cited by examiner

*Primary Examiner*—Sonny Trinh
(74) *Attorney, Agent, or Firm*—Bell, Boyd & Lloyd

(57) ABSTRACT

The invention relates to a method for controlling the exchange of data between mobile subscribers in a packet-oriented mobile communication network, wherein management of each subscriber occurs at a specific control node (SGSN) of the mobile communication network according to the actual whereabouts of the subscriber inside the mobile communication network; links from/to a mobile communication transmitter device of the mobile subscriber are controlled inside the mobile communication network by the corresponding control node; wherein an address register comprising all of the addresses allocated to mobile subscribers managed by said control node is stored in the control network node; a destination address allocated to the data packets is read out in the control network node from incoming data packets and is compared to the address register by means of a search function; if the destination address is available in the address register, the data packets are exclusively handled by the control node in the mobile communication network and are further transmitted; if the destination address is missing in the address register, the data packets are transmitted by the control node to another network node (GGSN) of the mobile communication network for further processing.

8 Claims, 1 Drawing Sheet

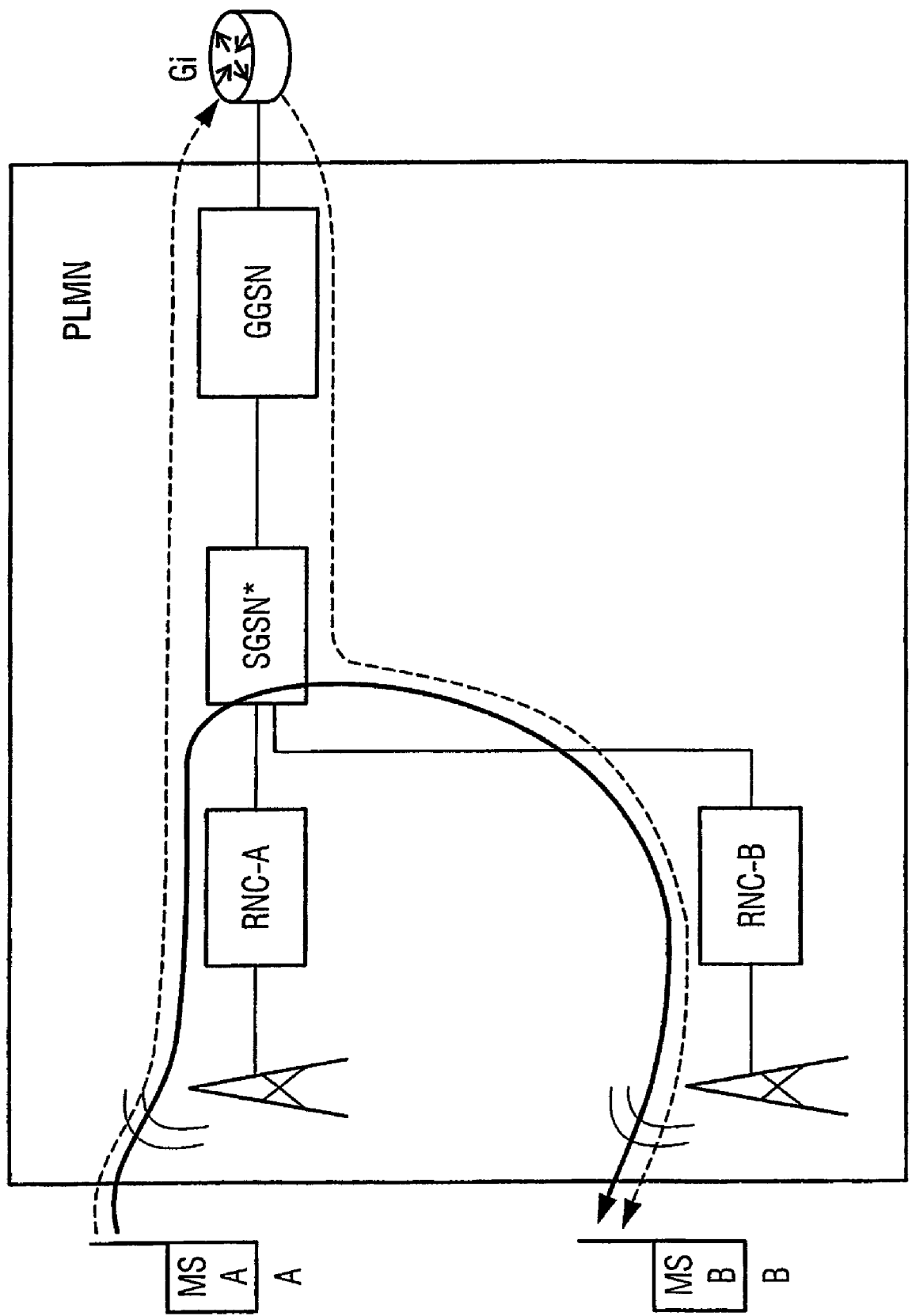

METHOD AND MOBILE RADIO COMMUNICATION NETWORK FOR THE TRANSMISSION OF PACKET DATA

The present invention relates to a method for a mobile radio telecommunication network for transmitting packet data between two mobile communication terminals. In networks for mobile communication, there are a plurality of network elements which are involved in the transmission of voice data, multimedia data or other useful data. The present architecture of mobile radio communication networks which are suitable for transmitting packet data, such as in GPRS and/or UMTS networks, is characterized, inter alia, in that there is a central gateway, in the case of a GPRS network a "GGSN", for example, which ensures a link to a packet data network, such as the Internet. Between a mobile communication terminal and the central gateway, subscriber data are tunneled in order to assist the mobility of the mobile communication terminal. A particular spatial area, a "routing area", has precisely one associated control network node, in the case of a GPRS network, an "SGSN", which controls the mobility of a mobile communication terminal. As regards the design and handling of logical connections, such as PDP contexts, the networks are optimized for "client/server" services. In the case of this type of communication, in principle, a plurality of subscribers or clients communicate from arbitrary locations, for example, in the form of a star, with a central server which is matched to the incumbent load. A further feature is the highly asymmetric traffic characteristic. There is very little traffic from the subscriber or client to the server, whereas from the server to the subscriber there is a comparatively large volume of traffic. A customary scenario in this case is, for example, data traffic between a mobile communication terminal and a destination which is situated outside of the actual mobile radio telecommunication network, that is to say behind the central gateway, such as a host on the Internet or a WAP-GW.

Accordingly, mobile radio communication networks are not suitable for applications which send data from a mobile communication terminal to another mobile communication terminal. Such direct data transmission from one user to another user is called a "peer-to-peer" or P2P transmission. At present, particularly on the Internet, more than proportional growth in the volume of data is being recorded, however, particularly in the case of "P2P services". One example which may be cited is, by way of example, markets for music and video clips which are based on direct data interchange between users.

As the scope of functions of mobile communication terminals, such as digital cameras, MP3 players or multimedia cards, increases, a similar user behavior can be expected for mobile users or "mobile subscribers" too. In contrast to simple text messages and ringtones, which can easily be sent using a "short message service", i.e. SMS, the volume of data produced as a result of sending audio and still-picture files or data streams, for example, will increase exponentially in this case. From the point of view of a network operator, it is therefore becoming increasingly attractive to route data in such a scenario as directly as possible, thus saving costs.

It is therefore an object of the present invention to provide a better support for "P2P services" in mobile radio communication networks, particularly in GPRS or UMTS networks, and to optimize the routing of packet data in situations which arise particularly frequently.

This object is achieved by a method as claimed in claim 1 and via mobile communication network as claimed in claim 4. Further preferred embodiments are illustrated in the subclaims.

Claim 1 provides a method for controlling data interchange between mobile subscribers in a packet-oriented mobile communication network, where
  each subscriber is managed at a particular control network node (SGSN) in the mobile communication network on the basis of his respective current location in the mobile communication network,
  connections from/to a mobile communication terminal associated with the mobile subscriber are controlled within the mobile communication network by the appropriate control network node, in which
  the control network node stores an address register containing all of the addresses associated with the mobile subscribers managed by the control network node,
  the control network node takes incoming data packets and reads a destination address associated with the data packets, and uses a search function to compare said destination address with the address register,
  if the destination address is present in the address register then the data packets are handled and forwarded within the mobile communication network exclusively by the control network node,
  if the destination address is absent from the address register then the data packets are routed from the control network node to a further network node (GGSN) in the mobile communication network for the purpose of further handling.

It is known, as already mentioned, that subscriber data packets passing through the mobile radio communication network transparently, that is to say in tunneled fashion, do not become visible until behind the central gateway, in the case of a GPRS network behind the GGSN, for example, i.e. behind the tunnel end point. From this central gateway, the data packets are then transported to an appropriately indicated destination address using conventional routing. From a first mobile communication terminal, a data packet, for example, is tunneled via a control unit, in the case of a UMTS network via a radio network controller (RNC), for example, a control network node, such as an SGSN, to the central gateway, such as a GGSN. At the central gateway node, the incoming data packet is then unpacked or decapsulated and is then routed. If the destination address is another second mobile communication terminal, then the data packet is routed to that central gateway node which manages a tunnel to the second mobile communication terminal. There, the data packet is packed or encapsulated again and is finally tunneled via a control network node, such as an SGSN, and a control unit, such as a radio network controller (RNC), to the destination address, i.e. to the second mobile communication terminal.

To date, it has been possible to interchange multimedia contents between two mobile communication terminals using a "multimedia message" service ("MMS"), for example. This service has a "multimedia message" service center ("MMSC") which acts as a buffer store when applying the "store-and-forward" principle. In this service, the data packets which are to be sent from one mobile communication terminal to another mobile communication terminal are generally routed via network nodes which are at a great physical distance, even if the mobile communication terminals are situated at locations close to one another. The result is unnecessarily high latencies and unnecessary loading of the network where it would otherwise be possible to transport additional packet data.

One advantage of the present invention is now that if the mobile communication terminals interchanging data are situated at locations close to one another and are therefore managed by the same control network node, in the case of a GPRS network by the same SGSN, for example, then the routing for these data packets is optimized. The search function which the invention provides at the control network node identifies relevant data packets, which are handled exclusively by the control network node, such as the SGSN, by bypassing a further network node, such as a GGSN in the case of a GPRS network. A significant proportion of the data traffic between two mobile communication terminals is brought about by users who are physically close to one another, such as when ringtones, logos, or MP3 data are interchanged between friends or acquaintances. In line with the invention, the data traffic in the "backbone" of the mobile radio communication network, such as in the GPRS backbone between an SGSN and a GGSN, is greatly reduced in these cases. Whenever a data packet is provided with a destination address which is stored in the control network node's address register, this is identified by the inventive search function, and the invention now involves the data packet which is thus identified as relevant being handled and forwarded only by the control network node. The invention thus avoids any bypass via a further network node. If the destination address is not present in the control network node's address register, the data packet is forwarded from the control network node to a further network node in the network, such as to a GGSN in a GPRS network, which node is then responsible for routing the data packet to its destination address.

In one particularly preferred embodiment of the inventive method, the address register chosen is a "hashing table" with a hash function so as to be able to decide as quickly as possible whether an incoming IP packet needs to be forwarded locally or via the GGSN. The hashing table comprises a list of entries containing only a binary value "1" or "0". The organization criterion, i.e. the address in the table, is calculated directly using the hash function. This is done by converting the IP address into its 32 or 128 bit value, which can be used to access the table directly. If the result of the test with the destination address of an IP packet arriving at the SGSN is the value "1", for example, then this signals the presence of a local destination, i.e. the communication partner is registered at the same SGSN as the sender of the IP packet, and in line with the invention the forwarding of the IP packet is then handled exclusively by the SGSN. If the result of the test is the value 0", then the IP packet needs to be routed via the GGSN. The table is updated during the PDP context handling. To this end, whenever a context is set up or canceled or modified, the IP address of the respective subscriber in the table is set to the respective value, that is to say by way of example to "1" for "available locally" and "0" for "not available".

Preferably, the mobile radio communication network chosen is a GPRS or UMTS network.

In addition, the present invention comprises a mobile radio communication network having at least one control network node, at which mobile subscribers in the mobile radio communication network are managed on the basis of their current location and connections from/to a communication terminal associated with a mobile subscriber managed at the control network node are controlled within the mobile radio communication network, where the control network node contains a filter function which is used to filter incoming data packets on the basis of a destination address which is respectively indicated in the data packets.

Preferably, the control network node contains a table which records all subscribers managed by the control network node with addresses appropriately associated with the subscribers. Using this table, the filter function is preferably able to perform a comparison between a destination address indicated in a data packet and the table's recorded addresses appropriately associated with the subscribers.

In one particularly preferred embodiment of the inventive mobile radio communication network, the control network node contains a routing function which can be used to route selected data packets with a destination address to this destination address by bypassing other network nodes.

In one particularly preferred embodiment of the inventive mobile radio communication network, the control network node contains the filter function and the routing function coupled to one another such that the data packets filtered out by the filter function on the basis of a destination address respectively indicated in the data packets can be forwarded to the respective destination address by the routing function by bypassing other network nodes. This means that if the destination address of a data packet arriving at the control network node is contained in the address register of the control network node, and this is accordingly identified by the control network node's filter function, then this data packet is routed to the destination address directly, bypassing other network nodes, such as a GGSN in a GPRS network, by means of the routing function provided at the control network node. This allows time and costs to be saved.

The invention thus provides support for "peer-to-peer services" or P2P services in a mobile radio communication network, too, in a similar manner to the development on the Internet. Use of the invention allows both the operator and mobile radio subscribers who are managed by the control network node to benefit from geographical proximity. For an operator the result is a lower load on the network between the SGSN and GGSN, and for a mobile radio subscriber shorter latencies and accordingly, lower charges.

Other advantages are demonstrated with reference to the figure below, in which

FIG. 1 shows a schematic illustration of an embodiment of the inventive method using the example of a GPRS network.

FIG. 1 shows an embodiment of the inventive method using the example of GPRS network. From the GPRS network, the present example shows a radio network controller RNC-A, which is responsible for the network access of a mobile radio subscriber A using his mobile communication terminal MS A, a control node SGSN, which on account of local proximity manages both the mobile radio subscriber A with his mobile communication terminal MS A and a further mobile radio subscriber B who has his mobile terminal MS B close by, a GGSN, which in the present case provides both A and B with a central gateway for linking to a packet data network (called logical reference point Gi in the standards), and a second radio network controller RNC-B, which is responsible for the network access of the subscriber B. A mobile radio subscriber A now wishes to use his mobile communication terminal MS A to set up a connection to a mobile radio subscriber B or to his mobile communication terminal MS B and to use the connection to send data packets. A data packet coming from A or coming from MS A contains a destination address, namely the address of the subscriber B or of MS B in the case illustrated.

It is now known (as indicated by the dashed line in FIG. 1) that the data packet is tunneled from MS A via the radio network controller RNC-A, the SGSN, to the GGSN. In the RNC-A, the data packet is encapsulated into an appropriate IP tunnel. This means that the data packet is handled transparently as far as the GGSN. Viewed logically, the data packet is not unpacked, i.e. decapsulated, until it is behind the GGSN, namely at the reference point Gi, and the destination address stored in the data packet is used to route it from there to this very destination address. In the present case, this means that where the destination addressee, namely the subscriber B, is situated at a location close to the subscriber A, the data packet is now returned from the reference point Gi to the same GGSN, is packed, i.e. encapsulated again there, and is routed from there to the same SGSN managing both A and B. The SGSN then routes the data packet to RNC-B and ultimately to MS B. In this case, the distance between SGSN and GGSN and between GGSN and, for example, an external router which is connected to the reference point Gi, is respectively covered twice, which is not necessary for the desired operation, namely sending a data packet from A to B. In line with the invention, the SGSN now has an address table, a search function and a routing function. In the table, each subscriber managed at the SGSN is allocated the IP address assigned to him during setup of a PDP context. The table is in this case constructed such that the search function and the destination address stored in the incoming data packet can be used to establish very quickly whether or not the destination address is contained in the table. If the destination address of subscriber B is contained in the table, as is the case in the present example, then the search function reads the interface identifier (denoting the physical link) of the RNC-B handling the subscriber B and the data packet is sent to the RNC-B directly via this interface. By handling the data packets at the interface to the radio access network, the GGSN is bypassed. In this way, the SGSN's search and filter function assessing the destination addresses, in conjunction with the address register or the table of all subscribers or their IP addresses managed by this SGSN at the respective time, allows optimized routing for the data packets which are to be sent between all of the subscribers managed by this SGSN at the respective time.

The invention claimed is:

1. A method for controlling data interchange between mobile subscribers in a packet-oriented mobile communication network, comprising:

managing each subscriber at a particular control network node in the mobile communication network on the basis of his respective current location in the mobile communication network, and controlling connections from/to a mobile communication terminal associated with the mobile subscriber within the mobile communication network by the appropriate control network node, wherein the control network node stores an address register containing all of the addresses associated with the mobile subscribers managed by the control network node, the control network node takes incoming data packets and reads a destination address associated with the data packets, and uses a search function to compare said destination address with the address register, if the destination address is present in the address register then the data packets are handled and forwarded within the mobile communication network exclusively by the control network node, and if the destination address is absent from the address register then the data packets are routed from the control network node to a further network node in the mobile communication network for the purpose of further handling.

2. The method as claimed in claim 1, wherein the address register chosen is a "hashing table" with a hash function.

3. The method as claimed in claim 1, wherein the mobile radio communication network chosen is a GPRS or UMTS network.

4. A mobile radio communication network having at least one control network node, at which mobile subscribers in the mobile radio communication network are managed on the basis of their current location and connections from/to a communication terminal associated with a mobile subscriber managed at the control network node are controlled within the mobile radio communication network, wherein the control network node contains a filter function which is used to filter incoming data packets on the basis of a destination address which is respectively indicated in the data packets.

5. The mobile radio communication network as claimed in claim 4, wherein the control network node contains a table which records all subscribers managed by the control network node with the addresses appropriately associated with the subscribers.

6. The mobile radio communication network as claimed in claim 5, wherein the filter function is able to perform a comparison between a destination address indicated in a data packet and the table's recorded addresses appropriately associated with the subscribers.

7. The mobile radio communication network as claimed in claim 4, wherein the control network node contains a routing function which can be used to route selected data packets with a destination address to the destination address by bypassing other network nodes.

8. The mobile radio communication network as claimed in claim 4, wherein the control network node contains the filter function and the routing function coupled to one another such that the data packets filtered out by the filter function on the basis of a destination address respectively indicated in the data packets are forwarded to the respective destination address by the routing function by bypassing other network nodes.

* * * * *